United States Patent [19]
Rice

[11] Patent Number: 5,516,068
[45] Date of Patent: May 14, 1996

[54] DEVICE SUPPORT BRACKET

[76] Inventor: Frank Rice, P.O. Box 2851, Danville, Calif. 94526

[21] Appl. No.: 923,065

[22] Filed: Jul. 31, 1992

[51] Int. Cl.$^6$ ........................................... A47F 5/00
[52] U.S. Cl. .......................... 248/300; 52/220.6; 248/906
[58] Field of Search .................... 248/906, 300, 248/343, 27.1; 220/3.9, 3.92; 52/220.1, 220.6, 714; 362/404, 365, 366, 147, 150

[56] References Cited

U.S. PATENT DOCUMENTS

| | | | |
|---|---|---|---|
| 1,156,885 | 10/1915 | Caine | 248/906 X |
| 1,288,024 | 12/1918 | Kendig | 248/906 X |
| 1,659,404 | 2/1928 | Lipschutz | 248/343 |
| 1,790,031 | 1/1931 | Vaughn | 220/3.9 |
| 2,023,083 | 12/1935 | Knell | 248/906 X |
| 2,930,564 | 3/1960 | Maier | 248/906 X |
| 4,957,251 | 9/1990 | Hubbard | 248/300 X |
| 4,964,525 | 10/1990 | Coffey et al. | 248/906 X |
| 4,998,635 | 3/1991 | Vink et al. | 248/906 X |
| 5,009,383 | 4/1991 | Chapman | 248/906 X |
| 5,178,350 | 1/1993 | Vink et al. | 220/3.9 X |

Primary Examiner—Ramon O. Ramirez
Assistant Examiner—Korie H. Chan
Attorney, Agent, or Firm—Philip H. Albert; Townsend and Townsend and Crew

[57] ABSTRACT

A support bracket spans framing members and is secured to two ceiling framing members, two studs, or between two tee-bars. The support bracket is wide enough to accommodate a device mount, which could be a junction box for electrified devices or a support bracket for non-electrified devices. The support bracket is open in the center to accommodate connections to the device mount from below, while still allowing access from above. The support bracket includes rails to accommodate junction box fastening screws. The support bracket is constructed with right angle flanges to add structural support and to allow for attachment of load-bearing support devices.

13 Claims, 11 Drawing Sheets

DEVICE SUPPORT BRACKET

BACKGROUND OF THE INVENTION

The present invention relates to the field of ceiling and wall mounted device supports. More specifically, in one embodiment the invention provides for an improved method and apparatus for securing into place at a ceiling or wall a device or devices.

Often it is necessary to install lights, plant hooks, banners, and other heavy items at the ceiling plane, or to wall mount devices such as receptacles for power, telephone, data, closed circuit cameras, or lights, and other items at the wall plane.

Electrical devices require junction boxes for making electrical connections. One means of supporting an electrical device at the ceiling plane is a crossbar on which an electrical junction box is mounted, as shown in FIG. 1.

FIG. 1 is a view from above a suspended ceiling 14, showing a junction box 10 mounted so as to allow access junction box 10 from beneath a ceiling tile 12. Ceiling tile 12 is one tile in suspended ceiling 14 (detail not shown), and is suspended from a building structure (not shown) by support wires 16 and tee-bars 18. Since ceiling tile 12 is not structurally sound enough to support junction box 10, a crossbar 20 is required to support junction box 10. Crossbar 20 is intended to be a junction box locating support only. As such, the combined assembly of crossbar 20, junction box 10, and a vertical support member 22 do not comprise a load-rated assembly to which devices can be attached unless independent support 16' is provided at junction box 10, which must extend to the building structure. Crossbar 20 and junction box 10 attached to crossbar 20 are free to pivot about vertical support 22, thus being an unstable means for supporting an electrical device. For those regions where seismic activity is a consideration, the combined assembly described must incorporate seismic tie wires (not shown) for rigidly securing the combined assembly into place.

Additionally, crossbar 20 must be located by vertical support members 22 to keep the bottom of the junction box 10 level with ceiling tile 12. Because crossbar 20 is the only means of support for junction box 10 and junction box 10 must be flush with ceiling tile 12, the vertical support members 22 must match the height of the junction box 10.

Even if two crossbars were used to prevent a junction box from pivoting and the junction box were mounted above the crossbars to avoid the height matching problem, the means for support is complicated, since two crossbars are needed, the crossbars themselves are not load-bearing, and the crossbars must be carefully spaced to align with the junction box attachment holes.

Access to an installed junction box is complicated by the fact that the crossbar, or crossbars, prevent access from above, since after installation, the ceiling tile and electrical device will prevent easy access from below.

Another method of supporting an electrical device at the ceiling plane is through the use of threaded rod to which a junction box is attached, as shown in FIG. 2. FIG. 2 is a view from above a suspended ceiling 14 of a junction box 10 utilizing a threaded support rod 24 which is attached to the building structure (not shown) and runs down to junction box 10. Junction box 10 is in turn adjusted to be flush with ceiling tile 12.

Because the space between the building structure and ceiling tile 12 is often occupied with piping, ducts, and wiring (not shown), and because threaded support rod 24 must be kept vertical at all times, this method of support can create conflicts when piping, ducts or the like pass over the vertical space above the point where threaded support rod 24 is to pass.

In regions where seismic activity is a consideration, junction box 10 must also be braced in a splayed manner to restrict movement in the horizontal plane. This is most often accomplished by extending three support wires 25 at 120 degree radial spacing from each other at approximately a 45-degree angle from vertical from junction box 10 at ceiling tile 12 to the building structure. These support wires further compound the interference which occurs between threaded support rod 24 and overhead duct work and the like.

In many instances, a building's structure does not coincide with the desired placement of threaded support rod 24. In such cases, the installation of threaded support rod 24 is complicated by the need to provide supplemental structural support elements such as metal channel which must be secured to the building's structural elements.

While tee-bars which support an acoustical tile ceiling might support a device, the reliance on tee-bars for support would limit the placement of a device to the boundaries of ceiling tiles formed by the tee-bar grid. However, designs and aesthetic considerations often dictate that a device be located within a ceiling tile, such as at the center of a ceiling tile.

Wall-mounted devices share common traits and mounting difficulties with ceiling-mounted devices, however additional difficulties arise where one or more electrical devices must be installed simultaneously within the confines of a space dictated by framing members. One such method for supporting single or multiple electrical junction boxes between framing members is shown in FIG. 3.

FIG. 3 is a view of a framed wall with external and internal coverings removed for clarity. A bracket 26 has multiple junction boxes 10 connected to it together with junction box extension rings 28. Junction box extension rings 28 can be used with or without junction boxes 10, depending on the application. Bracket 26 is secured to wall framing 30 at a desired height using mechanical fasteners 32. The fixed spacing of junction box openings 33 along the length of the body of bracket 26 does not allow for additional junction boxes to be placed at any desired position along the length of bracket 26, instead limiting placement to the four pre-defined openings 33. Furthermore, bracket 26 does not allow for what is known in the trade as a multi-gang junction box.

FIG. 4 is a view of a framed wall with external and internal coverings removed for clarity. A bracket 34 is secured to framing members 30 at a desired height using mechanical fasteners 32, and bracket 34 allows for the installation of single or multiple junction boxes 10 along the length of the bracket 34. However, because junction boxes 10 are mounted to the face of bracket 34, an installer must choose the correct bracket for the trade size junction box 10 which is to be installed. Additionally, bracket 34 can be used only to secure junction boxes 10 into place, and cannot be used to secure extension rings 28 (shown in FIG. 3) into place over the junction boxes, thereby requiring junction boxes for each extension ring 28 used. Attachment of junction boxes 10 to bracket 34 is made through the use of mechanical connectors 32, which are different than the mechanical connectors, typically metal screws, which are generally furnished with junction boxes 10. Thus, additional cost is incurred by an installer of such junction boxes, as provided hardware is wasted while additional fasteners are needed.

From the above it is seen that an improved means for mounting devices at framed ceiling or walls is needed.

SUMMARY OF THE INVENTION

An improved support bracket is provided by virtue of the present invention.

The support bracket spans two framing members, and is wide enough to accommodate a device mount, the device mount being one or more junction boxes for electrified devices, or one or more support brackets for non-electrified devices. The support bracket is open in the center to accommodate connections to the device mount while, in the case of accessible ceilings, still allowing access from above. The support bracket includes rails to accommodate device or support bracket fastening screws.

In one embodiment, the rails are continuous for maximum flexibility in arrangement of the device mount, and in other embodiments, the rails are interrupted by cross tabs for support of the rails. The cross tabs on one leg of the bracket are offset from the cross tabs on the other leg of the bracket, so as not to interfere with device mount screws. The support bracket is constructed with angled flanges to add structural support, and for attachment of load-bearing support devices if necessary. Load-bearing support devices can also be attached to the body of the bracket, however the angled flanges, especially when the flanges are right-angled, are more convenient for the attachment of load-bearing support devices.

Because the support bracket is mountable anywhere along framing members, and because a device is mountable anywhere along the support bracket, a device is mountable anywhere within the space created by two framing members, whether vertically or horizontally oriented. Because the support bracket is secured by mechanical means to framing members, supplemental supports in the form of support wires or rods are not required to ensure conformance with code related seismic standards.

A further understanding of the nature and advantages of the inventions herein may be realized by reference to the remaining portions of the specifications and the attached drawings.

DESCRIPTION OF THE PREFERRED EMBODIMENTS

Figure 5:
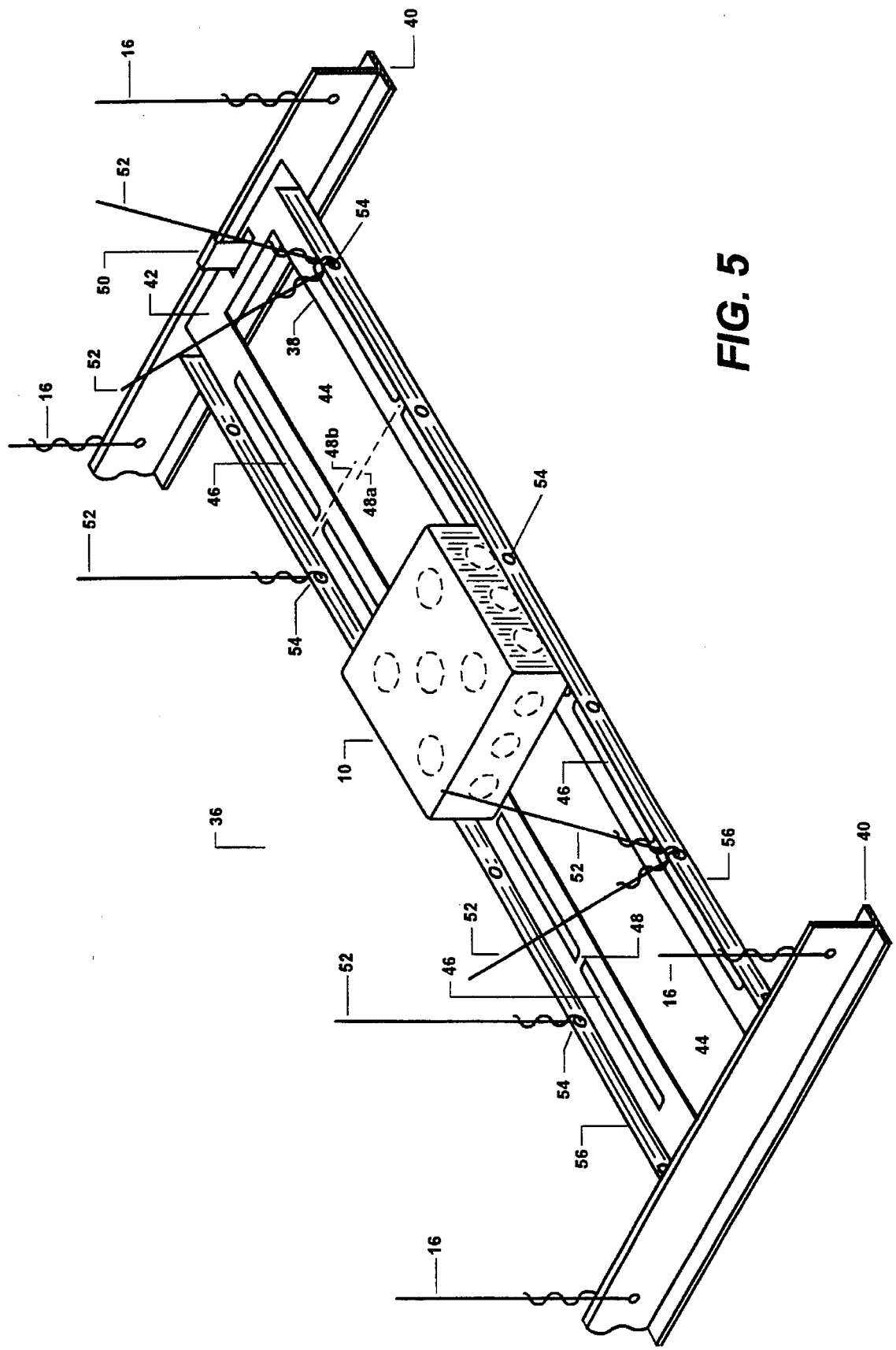
FIG. 5 is an isometric view of an embodiment of a support bracket according to the present invention, installed in a suspended ceiling, with a junction box mounted thereon.
Figure 6:
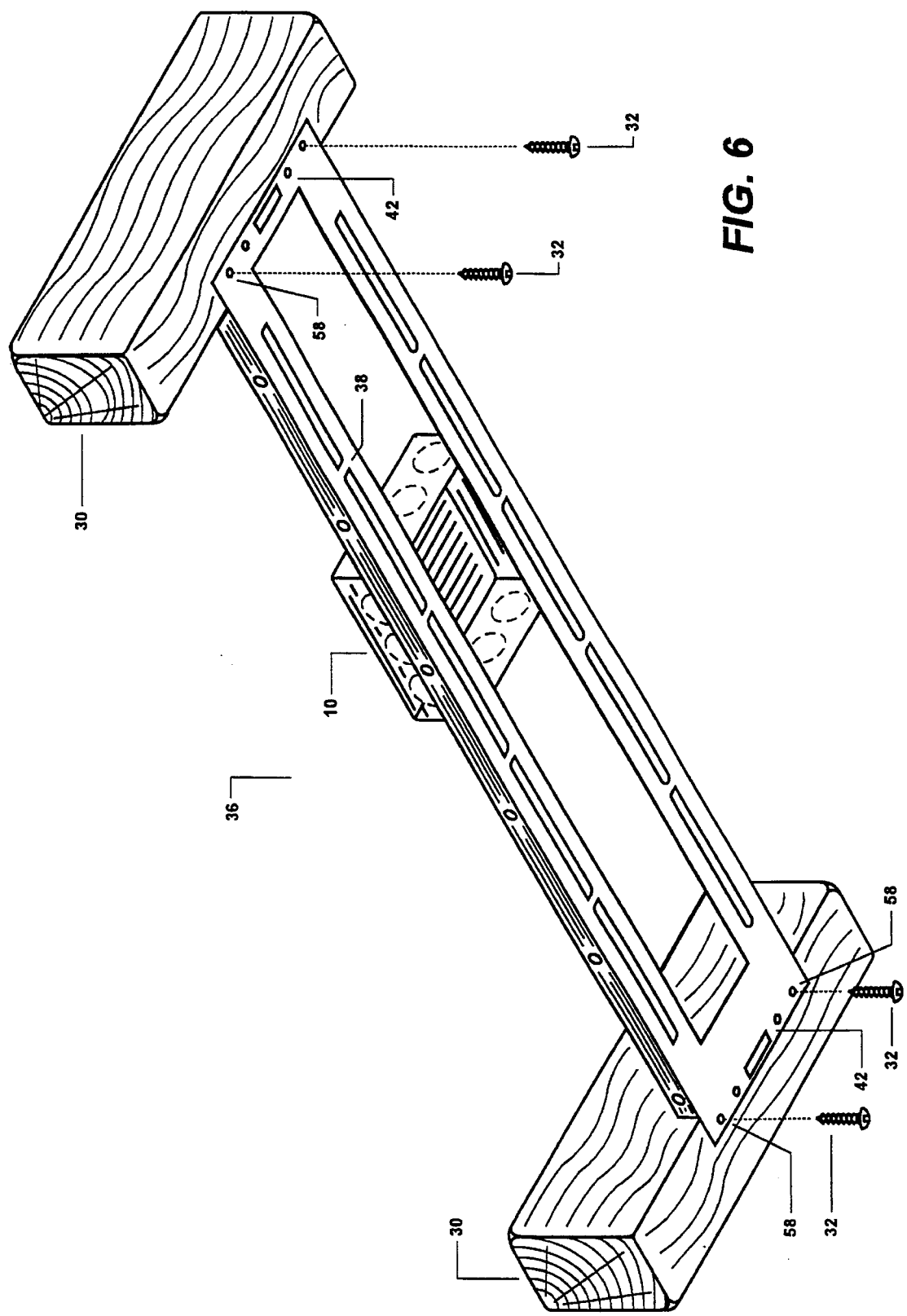
FIG. 6 is an isometric view of an embodiment of a support bracket according to the present invention, installed in a framed ceiling, with a junction box mounted thereon.

FIG. 5 shows one embodiment of a support bracket 36 according to the present invention. Support bracket 36 is formed as a body 38 with various structures thereon. Body 38, in one application, spans the space between two support members 40. Support members 40 are shown as tee-bars supported by drop wires 16 coupled to attachment tabs 42 of support bracket 36, however the attachment tabs 42 can also be attached to other types of framing members using framing member screw holes 58, such as wood or metal framing members as shown in FIG. 6.

In body 38, an access hole 44 is provided to allow access to junction box 10 from below after junction box 10 is mounted on support bracket 36. Because junction box 10 is attached to support bracket 36 from above, access from above support bracket 36 is not obscured. Junction box 10 is attached to body 36 using screws which are typically supplied with junction box 10 by the manufacturer of junction box 10.

Figure 7:
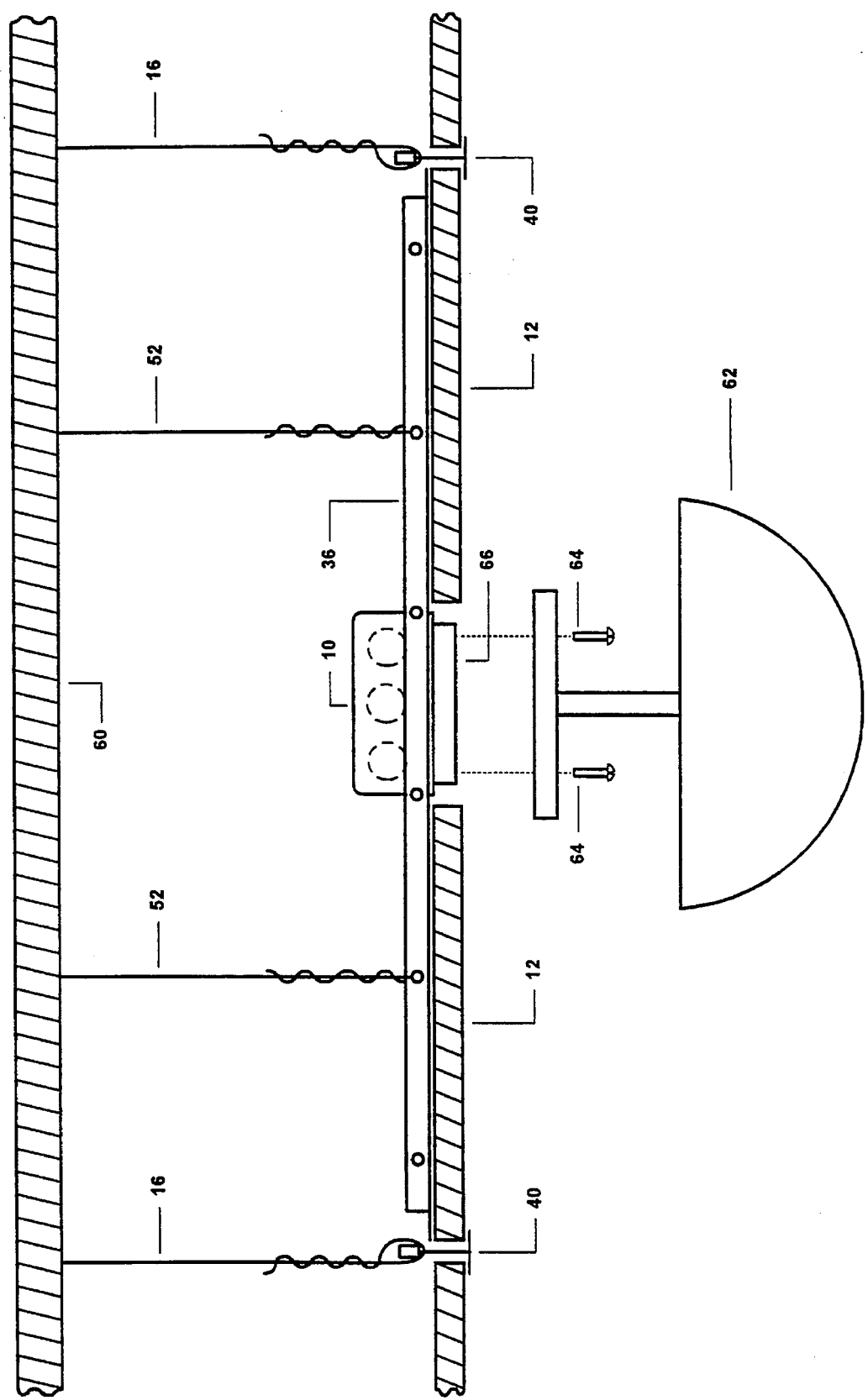
FIG. 7 is a cross-sectional view of an embodiment of a support bracket in place on a suspended ceiling.

Mounting slots 46 run substantially the entire length of body 38, to allow maximum flexibility in the placement of junction box 10. Mounting slots 46 are also sized to accommodate junction box mounting screws or other mounting hardware. For stability of mounting slots 46, cross tabs 48 are provided therein, although cross tabs 48 are not required. A support bracket 36', wherein mounting slots 46' contain no cross tabs is shown in FIG. 7. With a support bracket with cross tabs, opposing cross tabs, such as 48a and 48b shown on the upper half of the support bracket in FIG. 5, are offset so as not to interfere with the placement of junction box 10.

Referring again to FIG. 5, a tee-bar clip 50 attaches support bracket 36 to tee-bars 40. Tee-bar clip 50 is used to keep support bracket 36 in place laterally with respect to the tee-bar structure formed by tee-bars 40 and other tee-bars not shown, and therefore also with respect to any ceiling tiles supported by the tee-bar structure. The load-bearing support for support bracket 36, junction box 10, and any attached fixture, is typically provided by support devices 52 which extend from the building structure (not shown) and attach to some or all of wire tie holes 54 provided in support bracket 36. Although support devices 52 are shown at an angle in FIG. 5, in other embodiments, support devices 52 are vertical or extend in more than one plane for additional stability. Typically support devices 52 are comprised of wire, cable, chain, or metal rod. Angled flanges 56 are formed from body 38 to provide structural stability. Angled flanges 56 are shown as right angles in FIG. 5, however other angles are possible.

In an alternate application of support bracket 36, shown in FIG. 6, framing member screw holes 58 are used to attach attachment tabs 42 to framing members 30. Attachment tabs 42 are attached to framing members 30 from above or below, however FIG. 6 shows support bracket 36 attached from above to framing member 30 using mounting hardware 32.

FIG. 7 is a cross sectional view of the installation of support bracket 36 and a device 62 to a building structure 60. Device 62 is shown as a lighting fixture, however many other devices are possible. Device 62 and junction box 10 are attached to support bracket 36 using a mud ring 66 and mounting hardware 64. Mounting hardware 64 is typically comprised of machine screws furnished with device 62.

Use of support bracket 36 is straightforward. First, a location in a suspended ceiling or framed opening is selected for a device. Junction box 10 and/or extension ring 28 is then placed over access hole 44 and secured to support bracket 36 through mounting slots 46. Next, support bracket 36 is mounted above the plane of ceiling tile 12, wherein an opening exists to allow access to junction box 10 from below and to allow for mounting of the device. The mounting of support bracket 36 is achieved by attachment to bracket support devices 52 and to tee-bars 40. In the case of framed members, support bracket 36 is secured to framing members 30 by mechanical hardware 32, as shown in FIG. 6.

Tee-bars 40 are primarily for the support of lightweight ceiling tiles 12, and thus are generally not used to provide support for support bracket 36 and attached devices. Instead, load-bearing support is provided by support devices 52. Of course, support devices 52 can be secured directly to junction box 10 to provide load-bearing support of junction box 10 and attached devices. Where support bracket 36 is secured to framing members 30 by mechanical attachment means 32, the use of support devices 52 or other support means is not needed.

Figure 8:
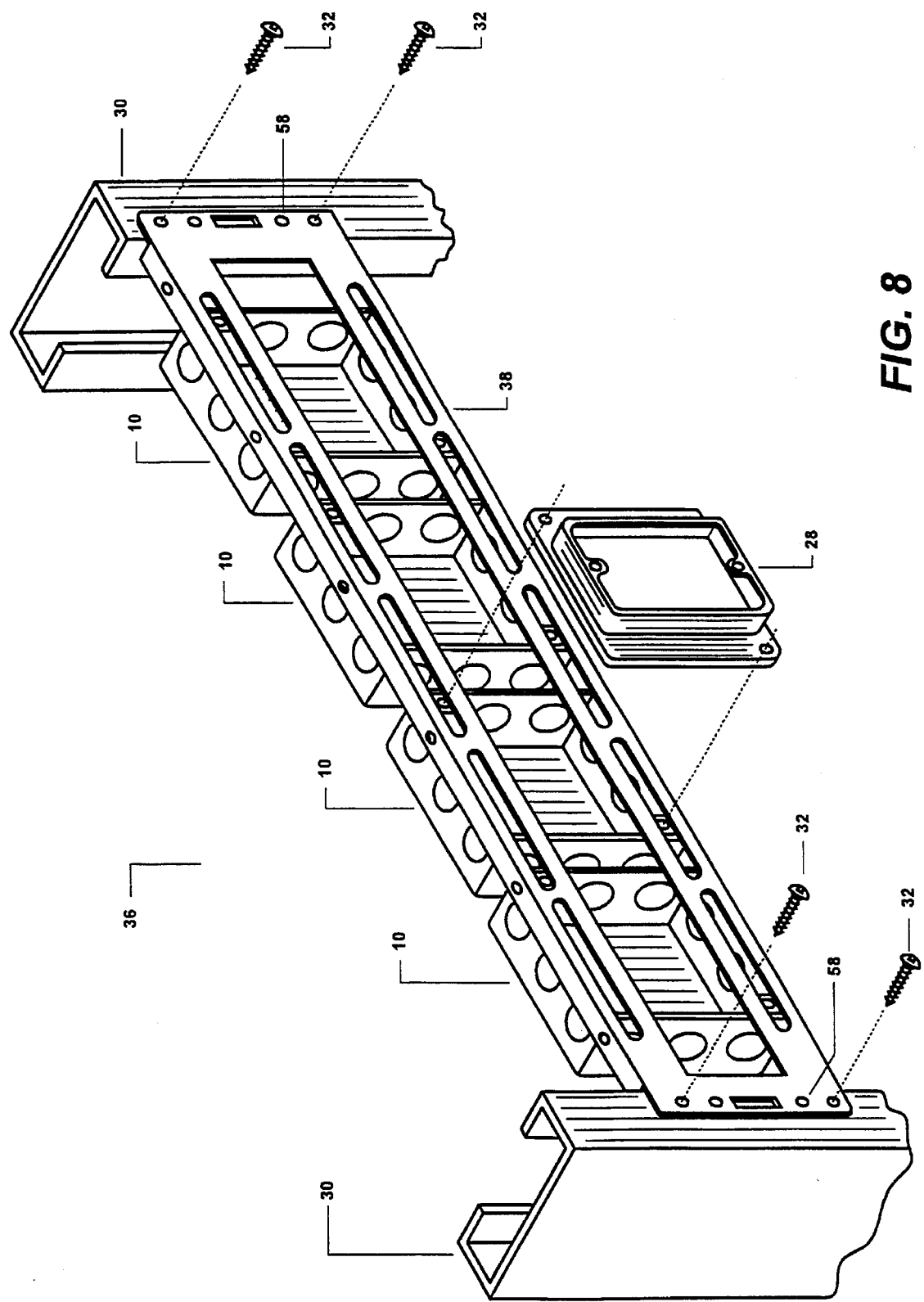
FIG. 8 is an isometric view of an embodiment of a support bracket according to the present invention, installed in a framed wall, with a junction box and extension rings mounted thereon.

FIG. 8 illustrates how the present invention is useful where more than one junction box must be mounted between two framing members. As shown, four junction boxes 10 are mounted on support bracket 36, which is in turn mounted between two framing members 30. Because junction box can be placed almost anywhere along support bracket 36, multi-gang junction boxes can be easily mounted on support bracket 36. FIG. 8 also illustrates the ease with which a junction box is aligned with a wall surface. Support bracket 36 is mounted between framing members 30 by mounting hardware 32, typically wood or metal screws depending on the composition of framing members 30, screwed through framing member screw holes 58, since framing member screw holes 58 are in the plane of support bracket body 38, junction boxes 10 are essentially flush with the outer plane of framing members 30. The extension ring 28 need only be selected to match the thickness of the framing structure covering such as drywall or the like.

Figure 9:
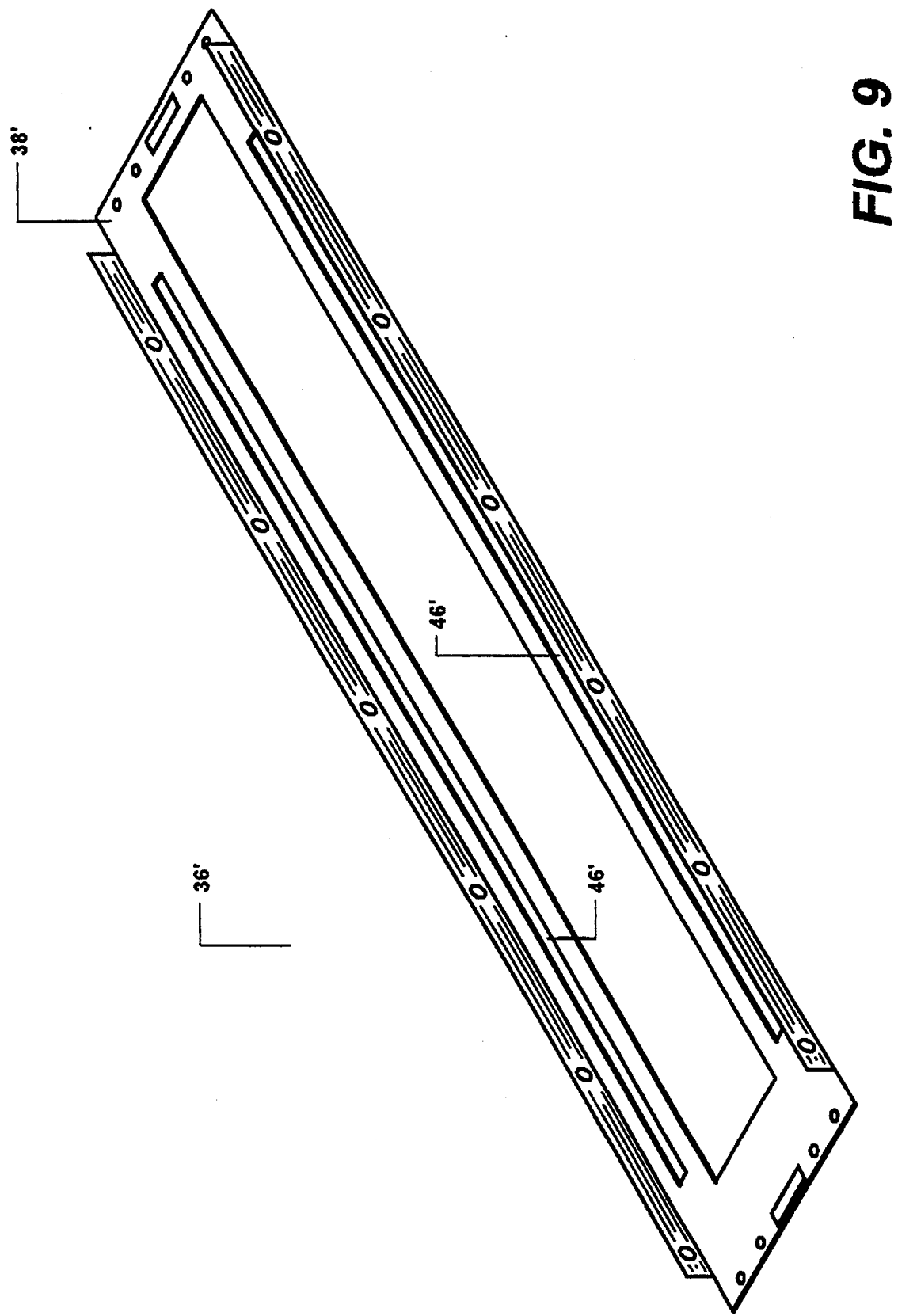
FIG. 9 is an isometric view of an embodiment of a support bracket without cross tabs.

FIG. 9 shows an alternate embodiment of the present invention, support bracket 36', before installation.

Figure 10:
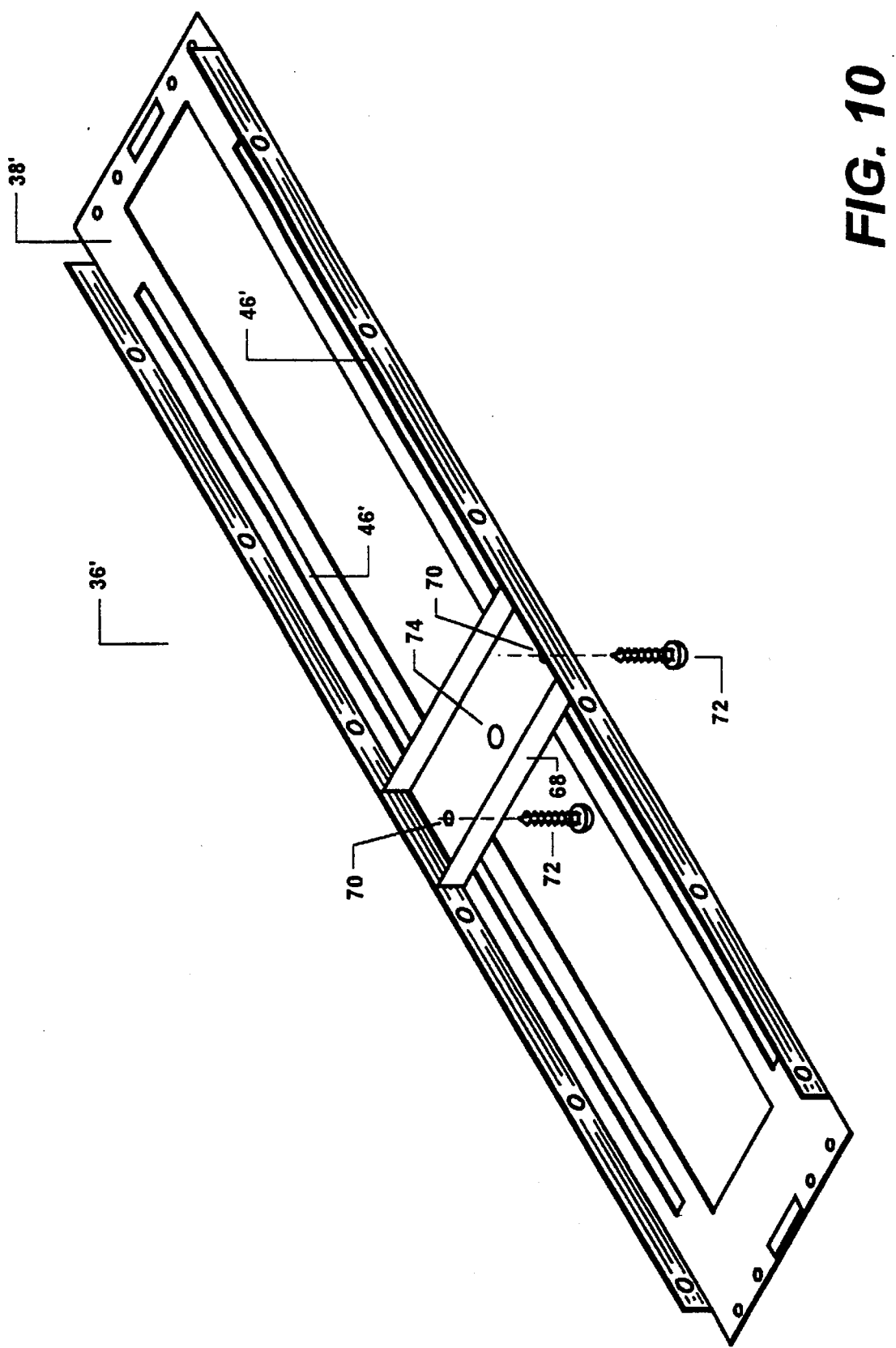
FIG. 10 is an isometric view of an embodiment of a support bracket with a device support member mounted thereon.

FIG. 10 shows a support bracket 36', which is also useful for supporting other device mounts, such as a device support member 68 which supports non-electrical devices. In one embodiment of the present invention, support member 68 has mounting holes 70 for attachment to support bracket 36' using mounting hardware 72 and mounting slots 46'.

Although support bracket 36', a support bracket without cross tabs 48, is shown in FIG. 10, support bracket 36 works equally well with such non-electrical device support members. A non-electrical device, such as a banner anchor or a plant hanger, can be attached to a device hole 74 on device support member 68.

Figure 1:
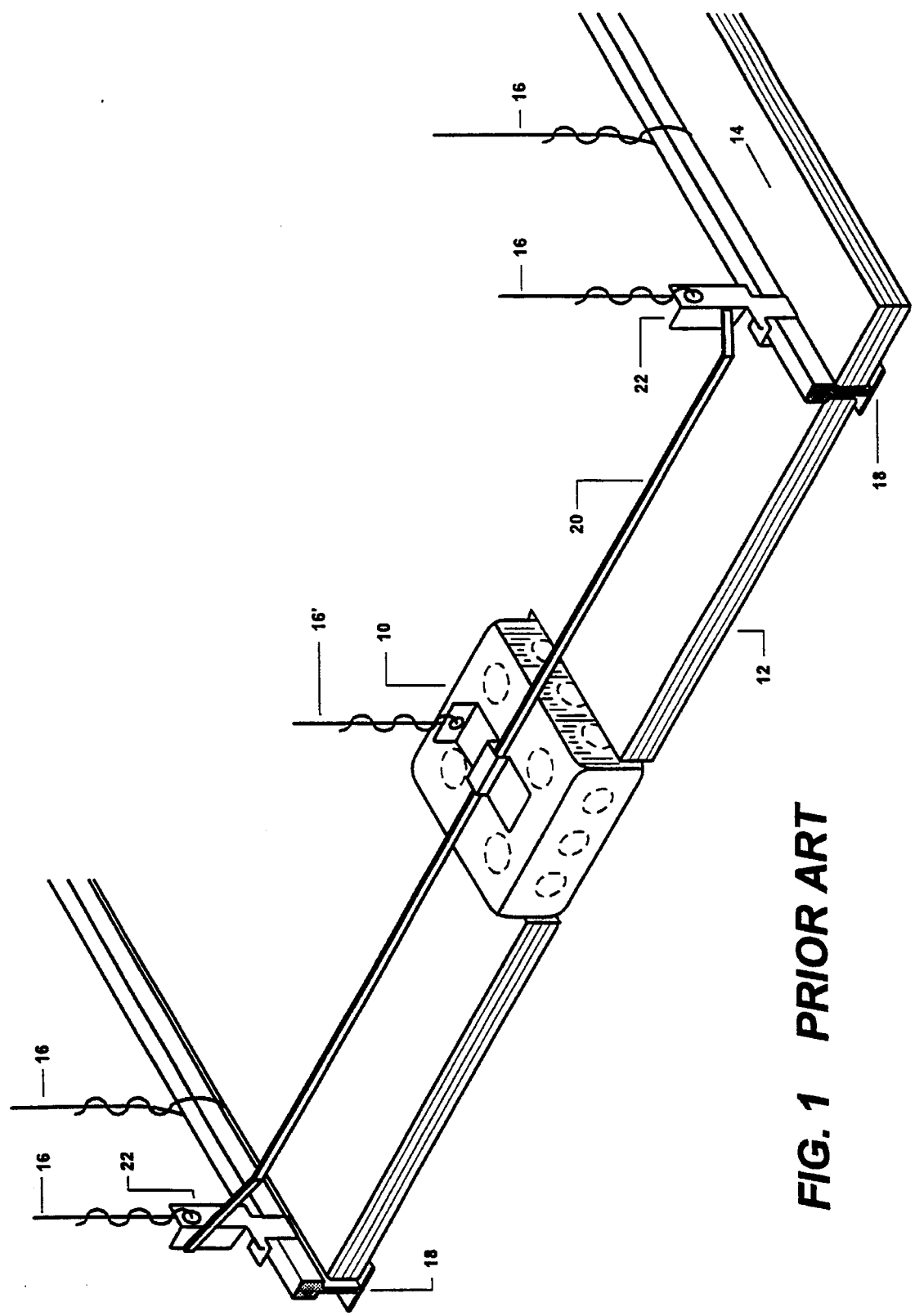
FIG. 1 illustrates a prior art crossbar means for mounting devices at a suspended ceiling.
Figure 2:
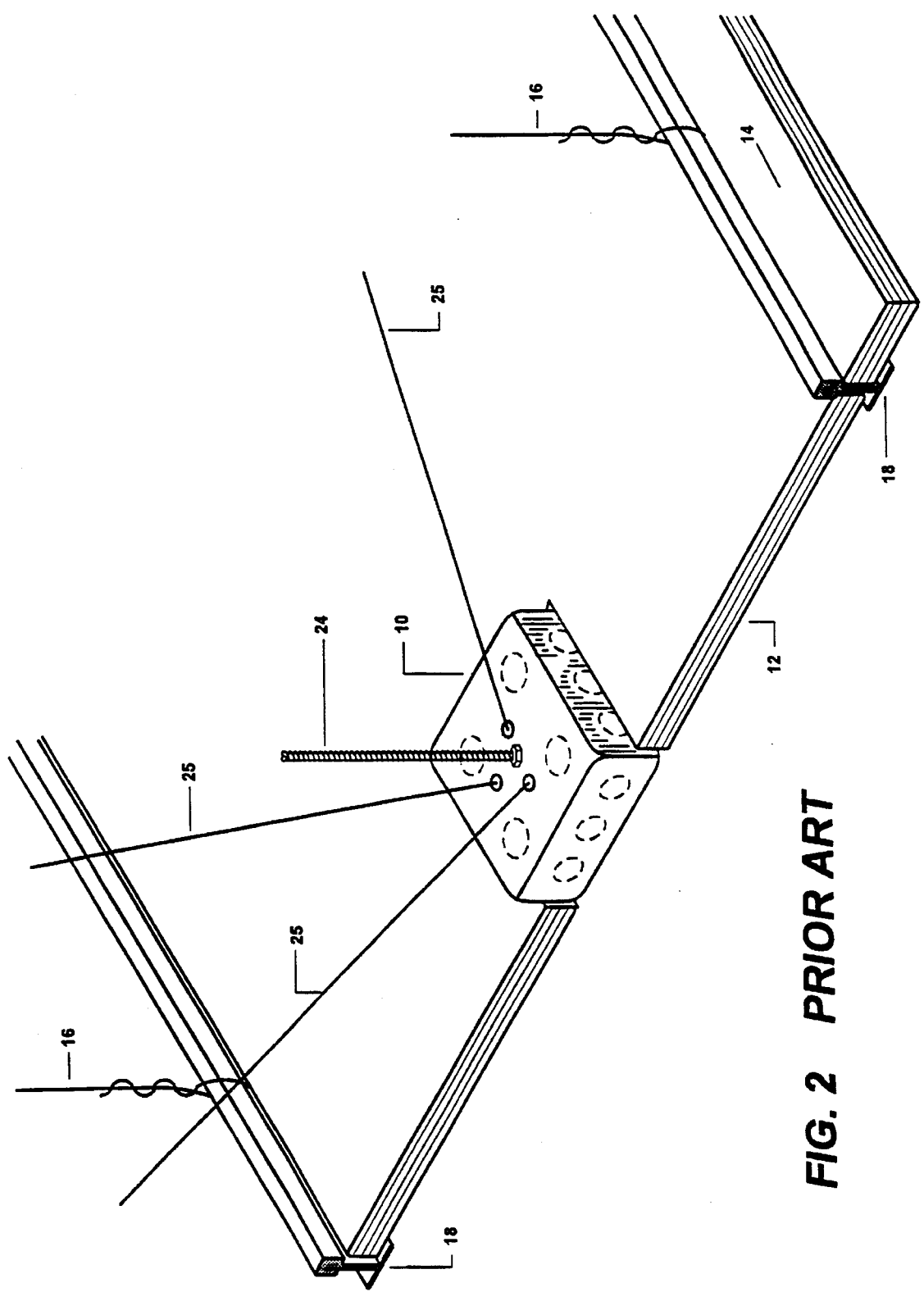
FIG. 2 illustrates a prior art threaded rod means for mounting devices at a suspended ceiling.
Figure 3:
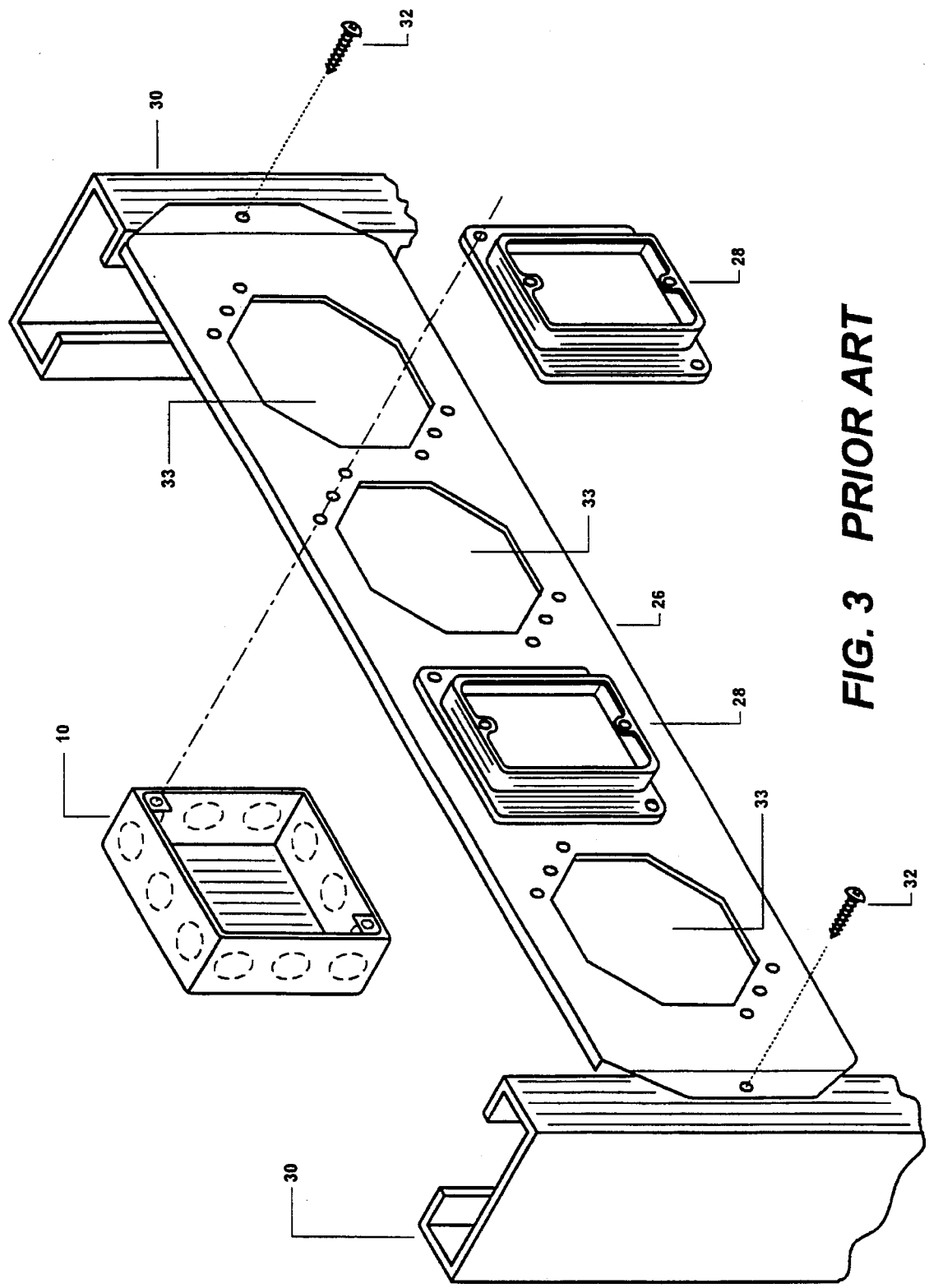
FIG. 3 illustrates a prior art bracket means for mounting devices at a framed wall.
Figure 4:
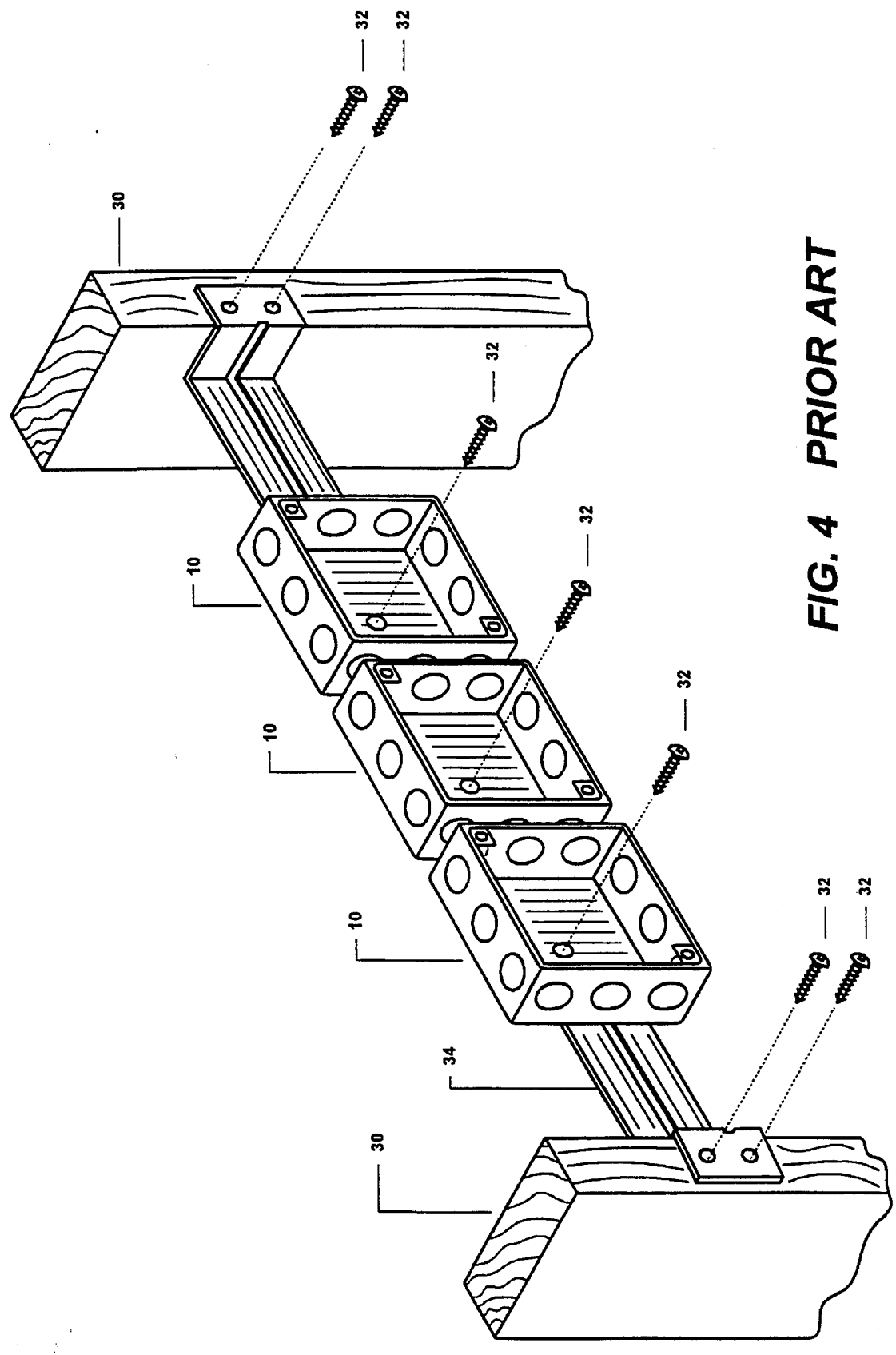
FIG. 4 illustrates a second prior art bracket means for mounting devices at a framed wall.
Figure 11:
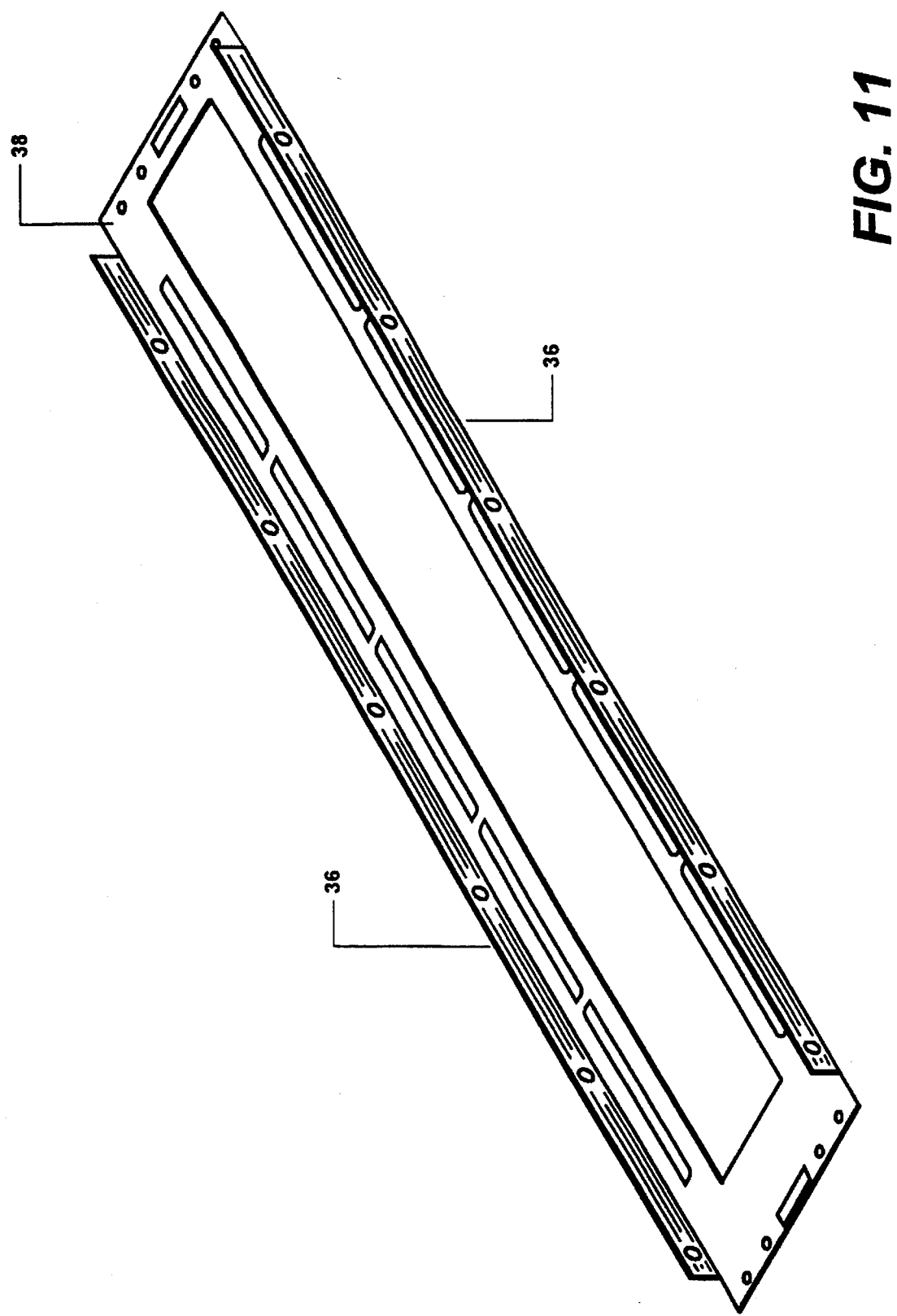
FIG. 11 is an isometric view of an uninstalled embodiment of a support bracket according to the present invention.

FIG. 11 shows support bracket 36 before installation. As can be seen from FIG. 11, support bracket 36 is easily manufactured from a single sheet of metal wherein various features are punched into the body 38 of support bracket 36 and angled flanges 56 are formed therein. Thus, the cost of using the present invention, as opposed to such devices as shown in FIGS. 1–2, with complicated shapes, clips, threading and mounting hardware, is greatly reduced.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A support bracket for supporting a device mount between framing members of a building structure, comprising:

an elongate unibody with a unibody length sufficient to span the framing members, said elongate unibody being a single sheet of metal;

mounting ends adapted for attachment of the support bracket to said framing members, said mounting ends formed from said single sheet of metal;

an aperture in said elongate unibody extending along an aperture length across substantially all of said unibody length, said aperture providing access through the support bracket to the device mount;

a first elongated mounting slot in said elongate unibody extending across substantially all of said aperture length; and a second elongated mounting slot in said elongate unibody extending across substantially all of said aperture length, said second mounting slot and said first mounting slot being on opposite sides of said aperture, wherein said first and second mounting slots are long enough to allow the device mount to be positioned at a mounting position anywhere within a continuous mounting range along said mounting slots and to allow a screw to be inserted into at least one the first or second mounting slots at any distance from the framing members within said continuous mounting range extending substantially all of said aperture length.

2. The support bracket of claim 1, further comprising angled flanges formed from said single sheet of metal extending transversely to said elongate unibody and across substantially all of said unibody length, for structural support of the support bracket, wherein said angled flanges are at right angles to said elongate unibody.

3. The support bracket of claim 2, further comprising:

attachment points on either of said elongate unibody or said angled flanges; and at least one load-bearing support device attached at a first end to at least one of said attachment points and said at least one load-bearing support device attached at a second end to a load-bearing structural member.

4. The support bracket of claim 1, wherein said first and second mounting slots are substantially parallel and are adopted to be separated by a distance substantially equal to a distance between mounting corners of a junction box.

5. The support bracket of claim 1 further comprising the device mount, wherein the device mount is an electrical junction box and is attached to said elongate unibody through said mounting slots.

6. The support bracket of claim 1 further comprising the device mount, wherein the device mount is a device support bracket and is attached to said elongate unibody through said mounting slots.

7. The support bracket of claim 1, wherein the framing members are ceiling framing members, and said mounting ends further comprise attachment means for attaching the support bracket to the framing members.

8. The support bracket of claim 1, wherein the framing members are wall framing members, and said mounting ends further comprise attachment means for attaching the support bracket to the framing members.

9. The support bracket of claim 1, wherein the framing members are wooden, and said mounting ends further comprise attachment means for attaching the support bracket to the framing members.

10. The support bracket of claim 1, wherein the framing members are metal, and said mounting ends further comprise attachment means for attaching the support bracket to the framing members.

11. The support bracket of claim 1, wherein the framing members are suspended ceiling members.

12. A support bracket for supporting a device mount between framing members of a building structure, comprising:

an elongate unibody with a unibody length sufficient to span the framing members, said elongate unibody being a single sheet of metal;

mounting ends adapted for attachment of the support bracket to said framing members, said mounting ends formed from said single sheet of metal;

an aperture in said elongate unibody extending along an aperture length across substantially all of said unibody length, said aperture providing access through the support bracket to the device mount;

a first mounting slot cut from said elongate unibody, interspersed with a first set of slot support tabs, said first mounting slot extending across substantially all of said aperture length; and a second mounting slot cut from said elongate unibody, opposite said aperture from said first mounting slot, said second mounting slot extending across substantially all of said aperture length and interspersed with a second set of slot support tabs offset from said first set of slot support tabs;

wherein said first set of slot support tabs and said second set of slot support tabs are relatively offset, thereby allowing a screw to be inserted into at least one of said first and second mounting slots at any distance from a framing member within a continuous mounting range which extends substantially all of said aperture length, with interference from no more than one slot support tab.

13. The support bracket of claim 12 further comprising a device mount which is a junction box with screw mounts in diagonal corners.

* * * * *